United States Patent
Wu et al.

[11] Patent Number: 5,966,801
[45] Date of Patent: Oct. 19, 1999

[54] AUTOMATIC DOOR FLUSHER

[75] Inventors: Shing-Kuo Wu, Ann Arbor; Mark C. Todd, Madison Heights; Dean A. Cuddy, Oakland; Andy Klopocinski, Troy, all of Mich.

[73] Assignees: Chrysler Corporation, Auburn Hills; Progressive Tool & Industries, Inc., Southfield, both of Mich.

[21] Appl. No.: 09/002,102

[22] Filed: Dec. 31, 1997

[51] Int. Cl.[6] ............................................. B23P 21/00
[52] U.S. Cl. ........................... 29/701; 29/281.5; 29/464; 29/468; 29/709; 29/714
[58] Field of Search .................................. 49/434; 29/464, 29/466, 468, 559, 700, 281.5, 281.4, 714, 709, 701

[56] References Cited

U.S. PATENT DOCUMENTS

| | | |
|---|---|---|
| 4,399,683 | 8/1983 | Hunter ........................................ 72/458 |
| 4,589,184 | 5/1986 | Asano et al. . |
| 4,589,199 | 5/1986 | Ohtaki et al. . |
| 4,627,158 | 12/1986 | Mitoh . |
| 4,736,515 | 4/1988 | Catena . |
| 4,744,135 | 5/1988 | Roels ........................................ 29/267 |
| 4,757,608 | 7/1988 | Ochi . |
| 4,768,277 | 9/1988 | Vogt et al. . |
| 4,861,099 | 8/1989 | Sasamura et al. ...................... 296/202 |
| 5,010,634 | 4/1991 | Uemura et al. . |
| 5,040,290 | 8/1991 | Usui et al. ............................... 29/787 |
| 5,079,832 | 1/1992 | Ozawa et al. . |
| 5,150,506 | 9/1992 | Kotake et al. . |
| 5,181,307 | 1/1993 | Kitahama et al. ........................ 29/434 |
| 5,203,115 | 4/1993 | Marinoni ................................. 49/388 |
| 5,203,811 | 4/1993 | Hirotani et al. . |
| 5,216,800 | 6/1993 | Nishigori . |
| 5,261,265 | 11/1993 | Nichols ................................... 72/420 |
| 5,331,837 | 7/1994 | Stuhlmacher ........................... 72/458 |
| 5,406,697 | 4/1995 | Busisi . |
| 5,563,483 | 10/1996 | Kowall et al. . |
| 5,829,114 | 11/1998 | Kleefeldt ................................. 29/468 |

*Primary Examiner*—S. Thomas Hughes
*Assistant Examiner*—Steven A Blount
*Attorney, Agent, or Firm*—Roland A. Fuller III

[57] ABSTRACT

The present invention provides an automatic door flusher which uses one floating urethane flushing block, at least two tractor elements for urging the flushing block toward the body and urging the door toward the floating flushing block. The tractor elements can be pneumatic suction cups.

10 Claims, 4 Drawing Sheets

AUTOMATIC DOOR FLUSHER

BACKGROUND OF THE INVENTION

1. Technical Field

The present invention relates generally to automobile manufacturing and, more particularly, to an automatic door flusher to flush a door of a vehicle to an adjacent body panel during manufacturing.

2. Discussion

In the assembly of automobiles, surface alignment of vehicle doors to the vehicle body is critical. The process to ensure this alignment is known as flushing. Failure to keep these surfaces flush results in poor aesthetic vehicle appearance and increased aerodynamic drag. The aerodynamic drag results in reduced vehicle fuel economy and performance.

In automobile assembly plants, flushing of doors to an adjacent body panel occurs in an assembly line generally after most of the vehicle is assembled but before painting of the vehicle surface. Before the door and body panel are flushed, the door is attached to the vehicle by its hinges. The door is maintained in a closed position by bungee cords attached to the door and interior of the vehicle. Traditionally, proper flushing of a door to an adjacent body panel required manual application of a magnetic block to the vehicle door and to the adjacent body panel. The block acts to bridge the door and body panel and pull the door against the force of the bungee cord thereby flushing the two surfaces.

Increased quality standards, such as 100% in-line inspection, requires automakers to automate the flushing process to maintain throughput (speed at which the vehicles are produced) with the increased quality standards. As a result, automatic tooling was developed which provides moving a flushing block with mechanisms such as slide units or dump units to a position adjacent to the door and body surface. The slide or dump units physically move the flushing block to a position next to the vehicle body and door. Like the magnetic block, when the flushing block is next to the vehicle body and door, the flushing block is used to flush the respective surfaces of the vehicle body and door. When the door is flush, measurements are taken to determine if the door is in the proper position. If the door is not in the proper position, then adjustments can be made to the vehicle door assembly process.

However, there are some drawbacks to this conventional automatic tooling as presently operated. First, conventional automatic tooling uses flushing blocks made from steel or other rigid materials. When this material contacts the vehicle body surface, it can dent or scratch the surfaces. Second, when the flushing block is improperly positioned, due to inherent body and design variations, the flushing block may not contact the body if positioned too far away or may dent the body surface if positioned too close. The present invention overcomes these drawbacks.

SUMMARY OF THE INVENTION

The present invention overcomes these problems by providing an automatic door flusher. The door flusher has one floating urethane flushing block, at least two tractor elements for urging the flushing block toward the body and urging the door toward the floating urethane flushing block. In a further aspect of the present invention, the automatic door flusher comprises three tractor elements. Two of the tractor elements are positioned such that they effectively engage a curved body surface. This positioning is accomplished by angling the face of each of the tractor elements with respect to the others. This angled positioning locates the face of the tractor elements parallel to the contours of a curved vehicle body surface. As a result, the tractor elements can more effectively attach to the curved surface. In another aspect of the present invention, multiple sets of flushing blocks and respective tractor elements are provided to flush the door surface and body surface of different vehicle designs. Here, each individual set of flushing blocks and tractor elements provides different suction pressures. Accordingly, each set may be located at different spatial positions to engage their respective differing vehicle geometries.

In another aspect of the present invention, the automatic door flusher is provided with a flushing block, two vacuum-actuated suction cups, a flushing block holder to hold the flushing block, and a linear actuator for moving the flushing block holder toward and away from the outer surfaces of the vehicle body panel and door. One vacuum-actuated suction cup draws the flushing block against the body side panel. The second vacuum-actuated suction cup draws the door to the surface of the flushing block. A linear actuator moves the block and vacuum-actuated suction cups to a close proximity to the respective surfaces. The linear actuator mobilizes in response to an electrical signal supplied by a processor. A third vacuum-actuated suction cup is provided to engage the outer surface of the vehicle door more effectively.

In another aspect of the present invention, a second flushing block and set of vacuum-actuated suction cups are provided to engage a different vehicle design. This second group provides a different operating pressure and is positioned at a different location to engage a different vehicle design.

In a third aspect of the present invention, a method is provided for flushing an outer surface of a door with the outer surface of an adjacent body panel. This method involves moving a floating flushing block next to a surface of the door and body panel; drawing the flushing block to the body panel; and finally drawing the outer surface of the door to the flushing block.

Additional advantages and features of the present invention will become apparent from the subsequent description and the appended claims taken in conjunction with the accompanying drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENTS

Figure 1:
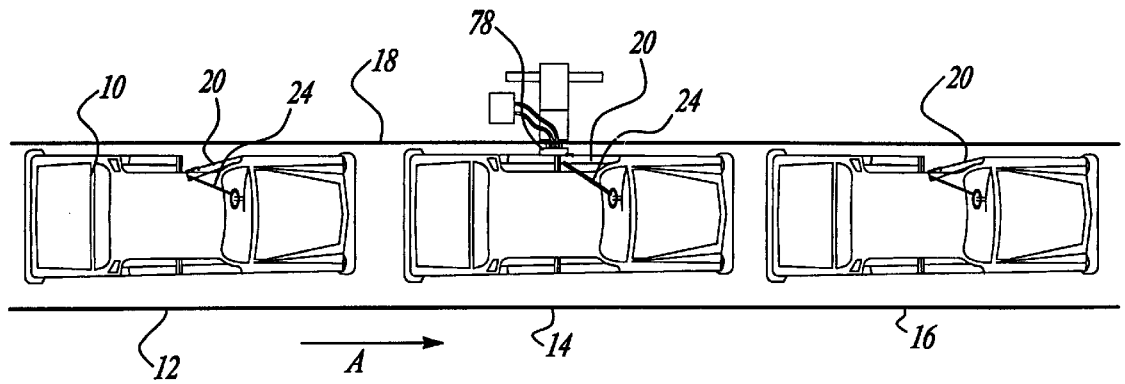
FIG. 1 is a top view of an automobile assembly line using an automatic door flusher according to the present invention.

With reference to FIG. 1, the general application of the present invention can be seen. In FIG. 1, an automobile 10 is shown at three different positions 12, 14 and 16 along an automobile assembly line 18. The assembly line is traveling in direction A. A vehicle door 20 is pulled past its closed position by bungee cord 24 as shown at position 12. When automobile 10 reaches position 14, a flushing block 78 of the present invention is bridged across the vehicle door 20 and vehicle body 22. The vehicle door 20 is pulled against the tension of bungee cord 24 to level the two surfaces. A three dimensional position of the door is then recorded. This recording may be performed by a laser unit used for determining the position of an object. Such devices and their use are well known in the art. Next the automobile 10 moves to position 16.

Figure 2:
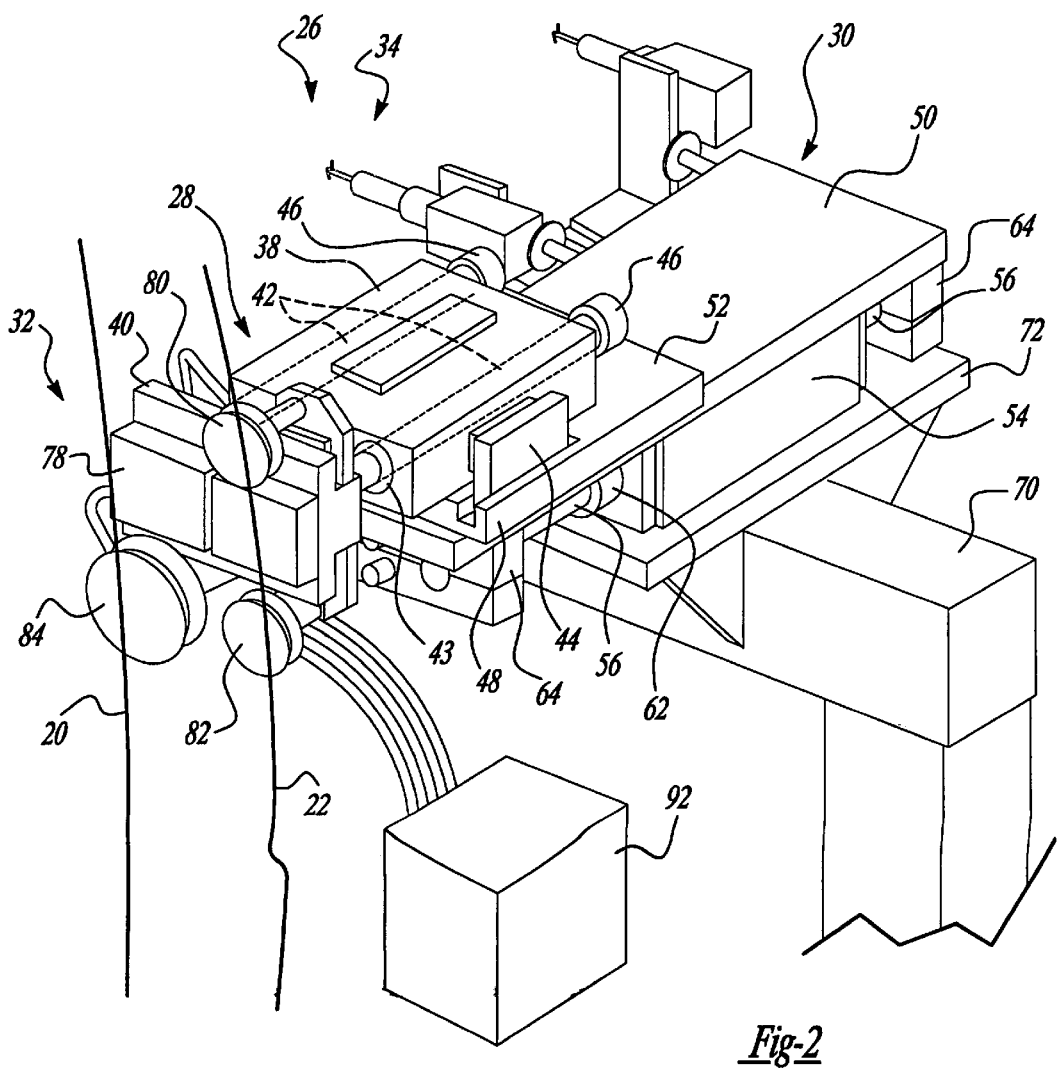
FIG. 2 is a perspective view of an automatic door flusher according to the present invention.

With reference to FIG. 2, the flusher 26 of the present invention will be described. FIG. 2 shows one assembly of an automatic door flusher generally designated as 26. The automatic door flusher 26 generally comprises an impact portion 28, a lateral movement portion 30, a flushing portion 32 and a control portion 34.

The impact portion has a spring box 38 which supports a flushing block holder 40 by spring shafts 42. The spring shafts 42 each have a respective spring 36 (see FIG.3) located within spring box 38. The springs 36 press against the flushing block holder 40 to drive the flushing block holder 40 toward a vehicle door 20 and body 22. The spring shafts 42 are guided by slip fitted passages 43 which extend through the entire length of spring box 38. Caps 46 keep spring shafts 42 from sliding out of the passages 43 and thus prohibit the flushing block holder 40 from falling out when vehicle door 20 and vehicle body 22 are not present. The spring box 38 is made of rigid material and is preferably made of cast or machined steel. The springs 36 located within the spring box 38 should have a spring constant sufficient to apply operating force to flushing block holder 40.

At least one spring shaft may be used. Here, two spring shafts 42 are preferred due to the increased support provided to flushing block holder 40. Brackets 44 affix spring box 38 to support surface 48. However, any other suitable means of fastening may be used such as welding.

The lateral movement portion has a gib 50 connected to a support surface 48 by bolts 52. Piston 54 is operationally engaged with piston shafts 56. Preferably, piston 54 is a bidirectional piston and is pneumatically operated. Additional methods such as electric motor driven belts, screw drives or other suitable methods may be used to move gib 50. Piston shafts 56 are clamped by retainer blocks 64 which are in turn bolted to gib 50. Rail 70 supports piston 54 by support area 72 which is welded to rail 74.

Figure 3:
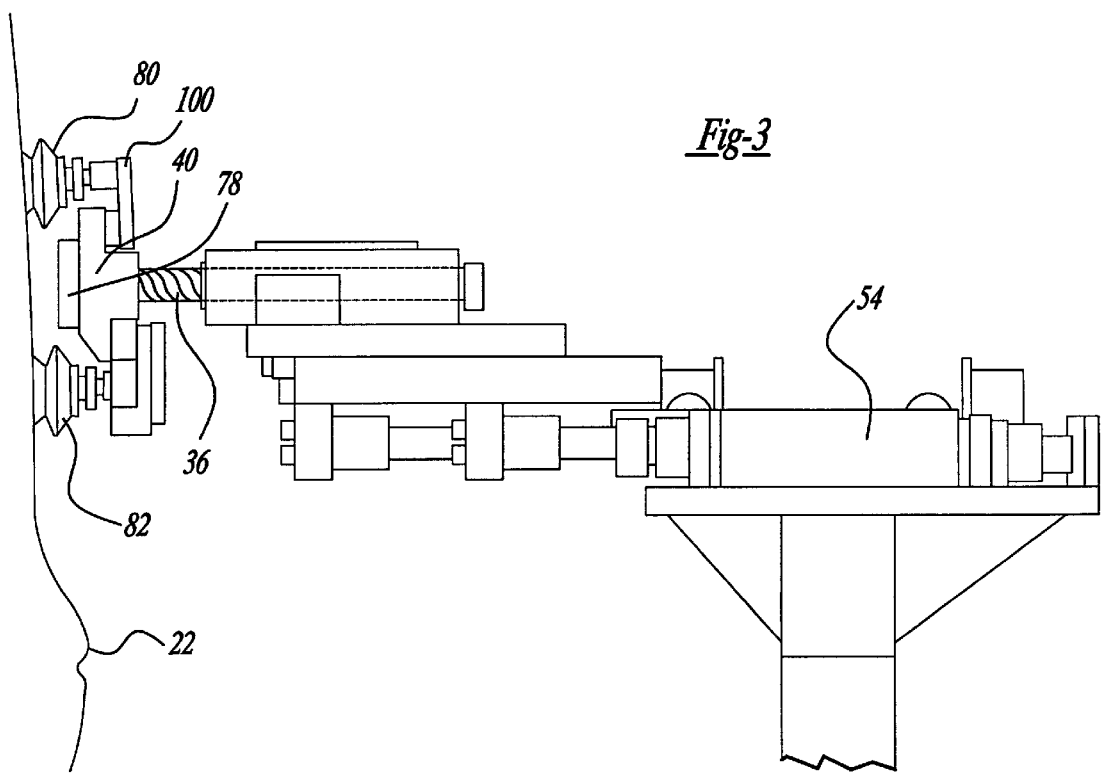
FIG. 3 is a side plan view of the automatic door flusher of FIG. 2.
Figure 4:
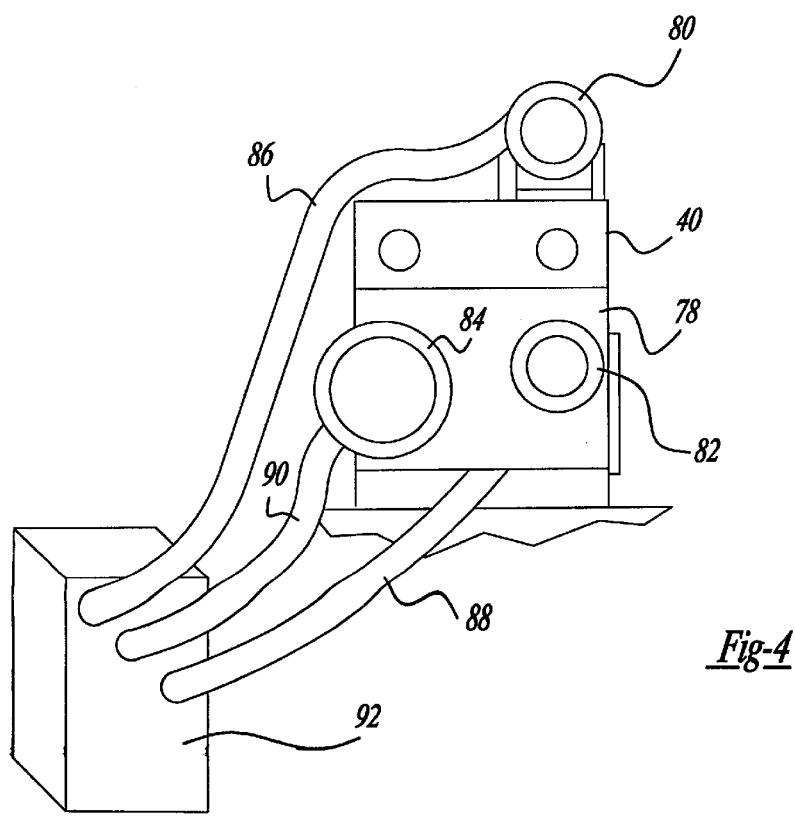
FIG. 4 is a front plan view of the automatic door flusher of FIG. 2.

Referring to FIG. 3 and 4, the flushing portion has flushing block holder 40 which supports flushing block 78 by glue, bolting, or any other suitable attachment means. Flushing block 78 is preferably made of an impact or non-scratching material such as urethane. However, flushing block 78 may be made of metal, plastic or any other suitable material for flushing the surface of a vehicle door to the surface of an adjacent body panel.

In FIG. 4, suction cups 80, 82, and 84 are attached to flushing block holder 40. The suction cups 80, 82, and 84 are preferably made of rubber, but may be made of any flexible material suitable for maintaining a vacuum between the internal portion of the cups and the external environment when the cup faces are in contact with another surface. Air pressure lines 86, 88, and 90 enable suction cups 80, 82, and 84, respectively, to be in fluid communication with pneumatic pump 92. Air pressure lines 86, 88, and 90 are attached to pneumatic pump 92 and suction cups 80, 82 and 84 by air tight fittings. As a result, pneumatic pump 92 supplies suction pressure to suction cups 80, 82, and 84.

Referring back to FIG. 3, suction cup 80 is attached to flushing block holder 40 by suction bracket 100. Suction bracket 100 is at an angle relative to the face of suction cup 82 to ensure that the face of suction cup 80 is not parallel with the face of suction cup 82. This non-parallel relationship between the face of suction cup 80 and the face of suction cup 82 allows for better attachment, as a whole, to a curved surface such as a vehicle body 22. It is noted that suction bracket 100 can be parallel with the face of suction cup 82 and may be angled at any such angle to allow effective attachment to a specific geometry of a vehicle surface.

Figure 5:
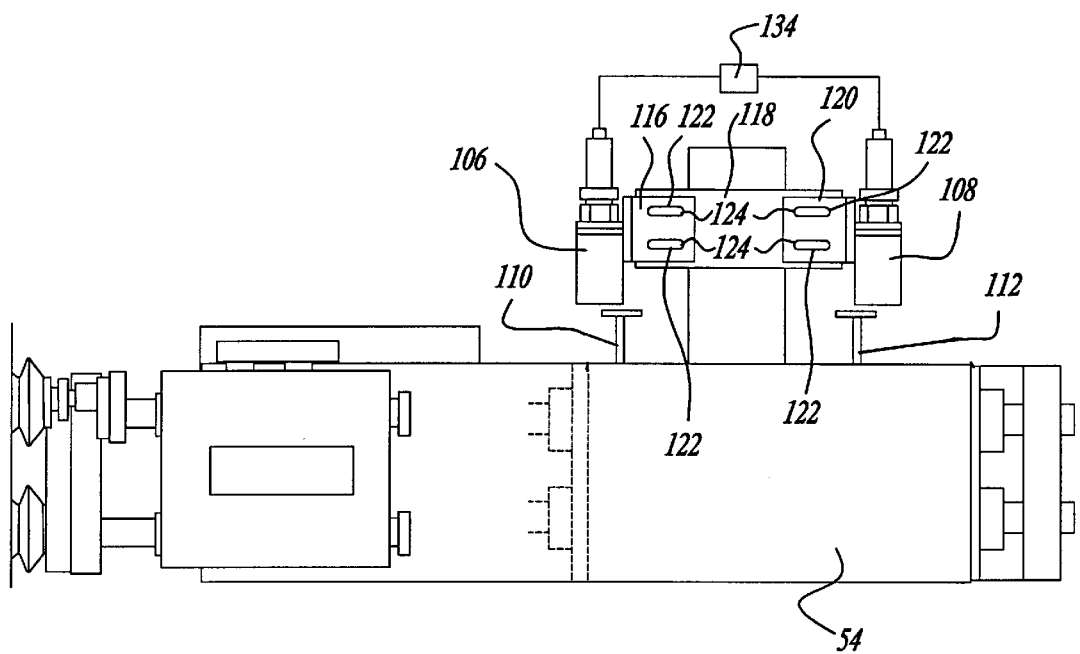
FIG. 5 is a top plan view of the automatic door flusher of FIG. 2.

Referring to FIG. 5, the control portion 34 has a forward proximity switch 106 and rear proximity switch 108 proximately located to forward pin 110 and rear pin 112. Forward pin 110 and rear pin 112 are rigidly attached to gib 50. The forward proximity switch 106 is attached by bracket 116 to support 118. Rear proximity switch 108 is attached to support 118 by bracket 120. Brackets 116 and 120 have oblong holes 122 through which bolts 124 are threaded to complete the attachment of brackets 116 and 120 to support 118. The oblong holes 122, of the forward proximity switch 106 and rear proximity switch 108 enable back and forth adjustment to allow their respective tripping at different positions.

The output from forward proximity switch 106 and rear proximity switch 108 is fed to a central processing unit 134. This central processing unit 134 is in electrical communication with the piston 54, forward proximity switch 106, rear proximity switch 108, pneumatic pump 92 and a vehicle position sensor (not shown). In operation, the central processing unit 134 is able to receive a signal from the vehicle position sensor indicating when a vehicle has moved along an assembly line to a position where its door and body may be flushed. The central processing unit 134 also receives signals from forward proximity switch 106 and rear proximity switch 108 indicative of the position of gib 60. In response to these signals, the central processing unit 134 can selectively actuate pneumatic pump 92 and the piston 54. The general operation of this system is discussed.

Referring to FIG. 2, the operation of the present invention will now be described. In operation, an automobile having a vehicle door 20 and a vehicle body 22, moves along an assembly line until it reaches a position where the vehicle door is to be flushed with the body (See FIG. 1). When the vehicle reaches this position, the vehicle position sensor is tripped. In response to this tripped signal, the central processing unit 134 of the present invention activates the pneumatic pump 92. The pump 92 actuates pistons 54 to move gib 50 in a direction toward the vehicle body. Gib 50 moves forward until piston 54 reaches the end of its stroke. Forward pin 110 is in a position which trips forward proximity switch 106. In response to the tripped signal from forward proximity switch 106, the central processing unit 134 knows that the automatic door flusher 26 is now in a position for flushing. Forward proximity switch 106 is positioned such that it trips when suction cups 80, 82 and 84 are at a position close to vehicle body 22 and vehicle door 20. Suction cups 80 and 82, now being proximately located to vehicle body 22 have suction pressure generated by pneumatic pump 92. Suction cups 80 and 82 pull flushing block 78 away from spring box 38 and toward vehicle body 22, thereby extending spring shafts 42 from spring box 38. As a result, flushing block 78 is positioned adjacent to the vehicle body 22. Suction cup 84 applies sucking pressure to vehicle door 20 pulling vehicle door 20 to a position adjacent to flushing block 78. Measurements are made of the position of the vehicle door 20 to determine if there is any build variation in the assembly process by a laser measuring device or any other suitable device for measuring the physical position of the vehicle door 20 with respect to the vehicle body 22. Such devices are well known. After the measurements of the vehicle door 20 are made, the central processing unit 134 actuates pneumatic piston 54 to move gib 50 in an opposite direction away from vehicle body 22 and door 20. The processor signals the pneumatic vacuum pump 92 to cease applying suction pressure to suction cups 80, 82, and 84 thereby eliminating suction force to the vehicle body and vehicle door. Gib 50 moves away from vehicle body 22 and vehicle door 20 until reaching the end of its stroke. Rear pin 112 is now in a tripped position with rear proximity switch 108. In response to a proximity signal from rear proximity switch 108, the central processing unit 134 ceases pneumatic pressure to piston 54 and indicates that another automobile may be jogged into position for flushing.

Figure 6:
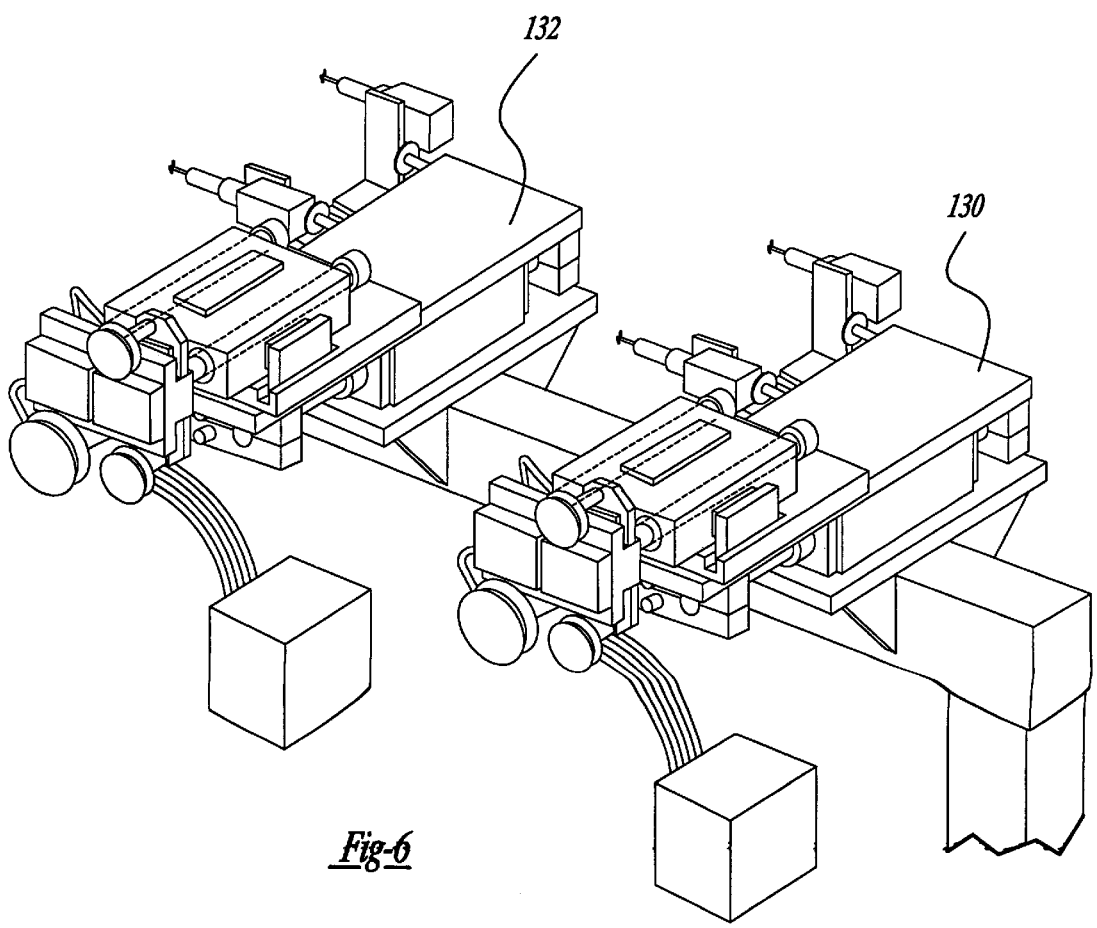
FIG. 6 is a perspective view of two assemblies of an automatic door flusher aligned next to each other according to a second embodiment of the present invention.

With reference to FIG. 6, a second embodiment of the present invention is shown. Door flusher assembly 130 is located next to door flusher assembly 132. Each door flusher assembly 130 and 132 independently comprises the same components as that discussed in the first embodiment. However, one central processing unit (not shown) is used to actuate both Door flusher assemblies 130 and 132. Door flusher assemblies 130 and 132 are mounted to rail 70 by weld, bolt or other fastening device.

Pneumatic piston shafts 56 of door flusher assembly 130 have different travel lengths than pneumatic piston shafts 56 of door flusher assembly 132. As a result, door flusher assembly 130 can move suction cups 80, 82 and 84 to a different position than that of door flusher assembly 132 before flushing vehicle door 20 to vehicle body 22. Also, pressure from pneumatic pump 92 on door flusher assembly 130 is different than that generated by pneumatic pump 92 on door flusher assembly 132. Thus, suction cups 80, 82 and 84 of door flusher assembly 130 can apply different suction pressure than suction cups 80, 82 and 84 of door flusher assembly 132. Likewise, forward proximity switch 106 and rear proximity switch 108 of door flusher assembly 130 are set at different positions along oval 122 than those of door flusher assembly 130. As a result of the above described variations, door flusher assembly 130 can flush a vehicle door 20 and vehicle body 22 of a different body style than that of door flusher assembly 132.

Figure 7:
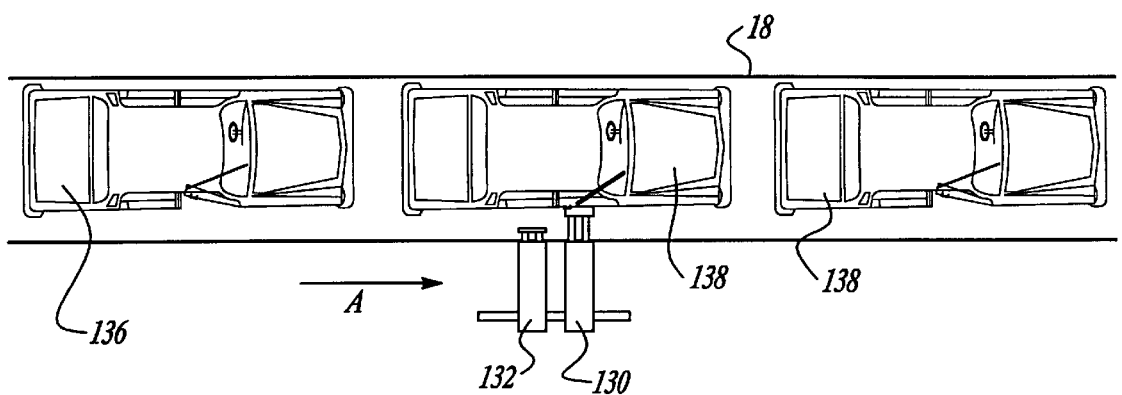
FIG. 7 is a top view of an automobile assembly line using two automatic door flusher assemblies according to the present invention.

Referring to FIG. 7, door flusher assemblies 130 and 132 are shown in conjunction with assembly line 18. Here, assembly line 18 is shown with two different vehicle body styles 136 and 138. Body style 136 has a different width and body surface shape than body style 138. Thus, when flushing a vehicle body with body style 136, a vehicle flusher must be used which can move flushing block 78 and suction cups 80, 82 and 84 to a different position than that associated with flushing a vehicle body with body style 138. This difference in position is due to the variance of vehicle widths between body styles 136 and 138. Likewise, a different suction pressure on suction cups 80, 82 and 84 must be used to grip the surface of a vehicle body with body style 136 than that associated with body style 138. This variance in suction pressure is due to the difference of the shapes of the respective vehicle surfaces.

When a vehicle with a body style 138 travels down assembly line 18 and is located at a position for flushing, a body style position sensor (not shown) is triggered. The body style position sensor sends a signal to central processing unit 134 indicating that a vehicle with body style 138 is in a position along assembly line 18 for flushing. In response to this signal, central processing unit 134 actuates door flusher assembly 130 as discussed in the first embodiment. Likewise, when a vehicle with a body style 136 travels down assembly line 18 and is located at a position for flushing, the body style position sensor (not shown) is again triggered. The body style position sensor sends a signal to central processing unit 134 indicating that a vehicle with body style 136 is in a position along assembly line 18 for flushing. In response to this signal, central processing unit 134 actuates door flusher assembly 132 as discussed in the first embodiment.

It should be noted that a central processing unit 134 is not required and that the pneumatic pump 92 and the pistons 54 may be actuated manually to provide for flushing a vehicle door with an adjacent body panel.

While the above detailed description describes the preferred embodiment of the present invention, it should be understood that the present invention is susceptible to modification, variation, and alteration without deviating from the scope and fair meaning of the subjoined claims.

What is claimed is:

1. An automatic door flusher for a vehicle for placing a door of the vehicle so that a surface of the door is flush with a surface of an adjacent body panel, comprising:

at least one assembly, the assembly comprising:
a processing unit for controlling said at least one assembly;
a floating flushing block;
a first element for urging the floating flushing block toward the body when said processing unit indicates that the vehicle with a door and body panel are in a position to be flushed, and said first element is in proximity with the body; and
a second element for urging the door toward the floating flushing block for flushing the door with the body panel, said processing unit releasing said second element after flushing of the door with the body panel.

2. An automatic door flusher as claimed in claim 1 further comprising a third element, the third element for urging the floating flushing block toward the body in response to said processing unit.

3. An automatic door flusher as claimed in claim 2 wherein the third element and the second element are positioned in a non-parallel relationship for effective engagement of a curved surface.

4. An automatic door flusher for a vehicle for placing a door of the vehicle so that an outer surface of the door is flush with an outer surface of an adjacent body panel of the vehicle, comprising:

at least one assembly, the assembly further comprising:
processing unit for controlling said at least one assembly;
a floating flushing block;
at least one body side vacuum actuated suction cup mounted to the floating flushing block and coupled to a vacuum source;
at least one door side vacuum actuated suction cup mounted to the floating flushing block and coupled to the vacuum source;
floating flushing block holder for holding the floating flushing block so that it is freely movable toward and away from the outer surfaces of the vehicle body panel and door;

a linear actuator coupled to the floating flushing block holder for moving the floating flushing block holder toward and away from the outer surfaces of the vehicle body panel and door in response to said processing unit;

the body side vacuum actuated suction cup contacting the outer surface of the body panel and drawing the floating flushing block toward the outer surface of the body panel in response to said processing unit; and the door side vacuum actuated suction cup contacting the outer surface of the door for flushing the door with the body panel and said processing unit releasing said suction cup after flushing of the door with the body panel.

5. An automatic door flusher as claimed in claim 4, wherein the linear actuator is a pneumatic cylinder, the pneumatic cylinder selectively moving the floating flushing block holder toward and away from the outer surfaces of the vehicle body panel and the door.

6. An automatic door flusher as claimed in claim 4, further comprising:

a position sensor providing a position signal indicative of a location of the vehicle;

a first travel sensor providing a first travel signal indicative of the floating flushing block being proximate to the outer surfaces of the vehicle body panel and door;

a second travel sensor providing a second travel signal indicative of the floating flushing block being distally located from the outer surfaces of the vehicle body panel and door; and the processor actuating the body side vacuum actuated suction cup, the door side vacuum actuated suction cup and the linear actuator in response to the position signal, the travel signal and the second travel signal.

7. An automatic door flusher as claimed in claim 4, further comprising a third vacuum actuated suction cup, the third vacuum actuated suction cup contacting the outer surface of the body panel and drawing the floating flushing block toward the outer surface of the body panel.

8. An automatic door flusher as claimed in claim 4, further comprising a second assembly.

9. An automatic door flusher as claimed in claim 8, wherein the body side and the door side vacuum actuated suction cups of the first assembly have a different suction pressure than a door side and body side vacuum actuated suction cups of the second assembly.

10. An automatic door flusher as claimed in claim 4, wherein the floating flushing block is made of urethane.

* * * * *